US010846121B2

(12) United States Patent
Mahkonen et al.

(10) Patent No.: US 10,846,121 B2
(45) Date of Patent: Nov. 24, 2020

(54) USING NANO-SERVICES TO SECURE MULTI-TENANT NETWORKING IN DATACENTERS

(71) Applicant: Telefonaktiebolaget LM Ericsson (publ), Stockholm (SE)

(72) Inventors: Heikki Mahkonen, San Jose, CA (US); Ravi Manghirmalani, Fremont, CA (US); Wassim Haddad, San Jose, CA (US); Meral Shirazipour, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 197 days.

(21) Appl. No.: 16/085,970

(22) PCT Filed: Jul. 1, 2016

(86) PCT No.: PCT/IB2016/053990
§ 371 (c)(1),
(2) Date: Sep. 17, 2018

(87) PCT Pub. No.: WO2017/158407
PCT Pub. Date: Sep. 21, 2017

(65) Prior Publication Data
US 2019/0079789 A1 Mar. 14, 2019

Related U.S. Application Data

(60) Provisional application No. 62/310,572, filed on Mar. 18, 2016.

(51) Int. Cl.
*G06F 9/455* (2018.01)
*G06F 21/60* (2013.01)
*H04L 29/06* (2006.01)

(52) U.S. Cl.
CPC ........ *G06F 9/45558* (2013.01); *G06F 21/606* (2013.01); *H04L 63/04* (2013.01);
(Continued)

(58) Field of Classification Search
None
See application file for complete search history.

(56) References Cited

U.S. PATENT DOCUMENTS 7,685,281 B1 * 3/2010 Saraiya ................. G06F 13/387
370/392
7,945,657 B1 5/2011 McDougall et al.
(Continued)

FOREIGN PATENT DOCUMENTS

| CN | 103973676 | * | 4/2014 | ............. H04L 29/06 |
| CN | 104104572 | * | 10/2014 | ............. H04L 12/46 |
| EP | 3026849 A1 | * | 6/2016 | ........... H04L 45/123 |

OTHER PUBLICATIONS

Rotem, "SOA Anti-pattern: Nanoservices", Apr. 2010.*
(Continued)

*Primary Examiner* — Piotr Poltorak
(74) *Attorney, Agent, or Firm* — Sage Patent Group

(57) ABSTRACT

A method and system to improve datacenter security by configuring a security layer as a set of nano-services that are executed to service a single tenant of the datacenter such that the nano-service protects the single tenant from other entities in the datacenter and the nano-service being compromised does not compromise the security of other tenants of the datacenter. The method includes receiving a request to instantiate a virtual resource for a tenant, generating a nano-service to implement at least one security layer function for the virtual resource, and connecting the nano-service to the virtual resource and a virtual bridge in the datacenter to enable communication between the virtual resource (vR) and a network of the datacenter with the security layer (Continued)

function processing traffic between the virtual resource and the virtual bridge. The nano-service can be immutable once it begins execution. The security layer function can be an L2 or L3 function.

18 Claims, 12 Drawing Sheets

(52) U.S. Cl.
CPC ........ *H04L 63/0435* (2013.01); *H04L 63/162* (2013.01); *G06F 2009/45587* (2013.01); *G06F 2009/45591* (2013.01); *G06F 2009/45595* (2013.01)

(56) References Cited

U.S. PATENT DOCUMENTS

| | | | |
|---|---|---|---|
| 7,962,647 B2 * | 6/2011 | Suri | H04L 45/00 709/224 |
| 8,583,891 B1 | 11/2013 | Spangler et al. | |
| 9,565,189 B1 * | 2/2017 | Gill | G06F 9/45558 |
| 10,348,767 B1 * | 7/2019 | Lee | H04L 67/10 |
| 10,395,029 B1 * | 8/2019 | Steinberg | G06F 21/554 |
| 2002/0031142 A1 | 3/2002 | Metin et al. | |
| 2003/0014525 A1 | 1/2003 | Delima et al. | |
| 2003/0191810 A1 | 10/2003 | Muhlestein et al. | |
| 2005/0080982 A1 * | 4/2005 | Vasilevsky | G06F 9/50 711/1 |
| 2005/0120160 A1 * | 6/2005 | Plouffe | G06F 9/4856 711/1 |
| 2006/0206300 A1 | 9/2006 | Garg et al. | |
| 2008/0018652 A1 * | 1/2008 | Toelle | G06T 15/005 345/506 |
| 2008/0201778 A1 | 8/2008 | Guo et al. | |
| 2009/0141692 A1 | 6/2009 | Kasslin et al. | |
| 2009/0150527 A1 * | 6/2009 | Tripathi | H04L 45/586 709/221 |
| 2009/0239469 A1 | 9/2009 | Rangarajan et al. | |
| 2009/0254990 A1 * | 10/2009 | McGee | G06F 21/53 726/22 |
| 2009/0292858 A1 * | 11/2009 | Lambeth | H04L 61/6022 711/6 |
| 2010/0050249 A1 * | 2/2010 | Newman | G06Q 20/40 726/15 |
| 2010/0142616 A1 | 6/2010 | Hegde et al. | |
| 2010/0165876 A1 * | 7/2010 | Shukla | H04L 41/0856 370/254 |
| 2010/0257269 A1 * | 10/2010 | Clark | G06F 9/5083 709/226 |
| 2011/0022694 A1 * | 1/2011 | Dalal | H04L 41/0856 709/222 |
| 2011/0134793 A1 * | 6/2011 | Elsen | H04L 49/70 370/254 |
| 2011/0208866 A1 | 8/2011 | Marmolejo-Meillon et al. | |
| 2013/0042297 A1 * | 2/2013 | Kim | G06F 21/53 726/1 |
| 2013/0085880 A1 * | 4/2013 | Roth | H04L 63/0428 705/26.1 |
| 2013/0125125 A1 * | 5/2013 | Karino | G06F 9/5044 718/1 |
| 2013/0329584 A1 * | 12/2013 | Ghose | H04L 45/586 370/252 |
| 2014/0006580 A1 | 1/2014 | Raghu et al. | |
| 2014/0072175 A1 | 3/2014 | Hasler et al. | |
| 2014/0115578 A1 * | 4/2014 | Cooper | H04L 63/1416 718/1 |
| 2014/0123118 A1 * | 5/2014 | Goetz | G06F 8/447 717/140 |
| 2014/0325640 A1 | 10/2014 | Aggarwal et al. | |
| 2015/0106913 A1 * | 4/2015 | Wang | H04L 63/0236 726/13 |
| 2015/0281047 A1 * | 10/2015 | Raju | H04L 49/70 709/244 |
| 2015/0288768 A1 * | 10/2015 | Goyal | H04L 67/02 709/228 |
| 2015/0296020 A1 | 10/2015 | Granqvist et al. | |
| 2015/0355985 A1 | 12/2015 | Holtz et al. | |
| 2015/0378760 A1 * | 12/2015 | Su | G06F 9/45558 718/1 |
| 2016/0112475 A1 | 4/2016 | Lawson et al. | |
| 2016/0119256 A1 * | 4/2016 | Wang | H04L 49/70 370/401 |
| 2016/0182458 A1 * | 6/2016 | Shatzkamer | H04L 63/0428 713/168 |
| 2016/0269425 A1 | 9/2016 | Shieh et al. | |
| 2016/0301603 A1 * | 10/2016 | Park | H04L 41/0893 |
| 2016/0342801 A1 | 11/2016 | Sreekanti et al. | |
| 2016/0371127 A1 | 12/2016 | Antony et al. | |
| 2016/0378545 A1 | 12/2016 | Ho | |
| 2017/0019457 A1 | 1/2017 | Latha et al. | |
| 2017/0155724 A1 * | 6/2017 | Haddad | H04L 41/5051 |
| 2017/0187818 A1 | 6/2017 | Haswell et al. | |
| 2017/0366455 A1 | 12/2017 | Pongracz et al. | |

OTHER PUBLICATIONS

Avaya, "Avaya Application Solutions: IP Telephony Deployment Guide", 555-245-600, Issue 3.4.1 Jun. 2005.*

Fifield et al. "Open Stack Operations Guide. Set up and Manage Your Openstack Cloud", ISBN: 978-1-491-94695-4, May 2014.*

Agache, et al., "Increasing Datacenter Network Utilisation with GRIN," USENIX Association, 12th USENIX Symposium on Networked Systems Design and Implementation (NSDI '15), May 4-6, 2015, pp. 29-42.

Apcera, Inc., "Apcera Architecture Overview," Whitepaper, Oct. 2015, downloaded from https://www.apcera.com/apcera-architecture-overview on Jul. 15, 2016, 17 pages.

Denton, J., "Neutron Networking: Neutron Routers and the L3 Agent," downloaded from https://developer.rackspace.com/blog/neutron-networking-l3-agent/ on Jul. 18, 2016, published Jan. 7, 2014, 20 pages.

Docker Inc., n. d. web., downloaded from http://www.docker.com/ on Jul. 18, 2016, 8 pages.

Ford, et al., "TCP Extensions for Multipath Operation with Multiple Addresses," Internet Engineering Task Force (IETF), Request for Comments (RFC): 6824, Jan. 2013, 64 pages.

Heuschkel, et al., "VirtualStack: A Framework for Protocol Stack Virtualization at the Edge," 40th Annual IEEE Conference On Local Computer Networks (LCN), IEEE, XP032844456, Oct. 26, 2015, pp. 386-389.

Johansson, I., "Congestion control for 4G and 5G access," draft-johansson-cc-for-4g-5g-01, Network Working Group, Internet-Draft, Internet Engineering Task Force (IETF), IETF Trust, Apr. 12, 2016, 14 pages.

Kerrisk, M., "Linux Programmer's Manual, Namespaces (7)," Linux man-pages project, downloaded from http://man7.org/linux/man-pages/man7/namespaces.7.html on Jul. 18, 2016, 5 pages.

Kuranda, S., "The 10 Biggest Data Breaches of 2015 (So Far)," CRN, The Channel Company, Jul. 27, 2015, downloaded from http://www.crn.com/slide-shows/security/300077563/the-10-biggest-data-breaches-of-2015-so-far.htm on Jul. 18, 2016, 11 pages.

KVM, "Virtio," n.d. web., downloaded from http://www.linux-kvm.org/page/Virtio on Jul. 18, 2016, 2 pages.

Open vSwitch, 2014, Web., downloaded from http://openvswitch.org/ on Jul. 18, 2016, 1 page.

OpenStack, Apache 2.0, n.d., Web., downloaded from http://www.openstack.org/ on Jul. 18, 2016, 9 pages.

OpenStack Foundation, "OpenStack Operations Guide," Creative Commons Attribution 3.0 License, Mar. 19, 2016, 416 pages.

Purdy, George N., "Linux iptables Pocket Reference," O'Reilly Media, Aug. 2004, 97 pages.

Soltesz, et al., "Container-based Operating System Virtualization: A Scalable, High-performance Alternative to Hypervisors," ACM SIGOPS Operating Systems Review, vol. 41, Issue 3, Mar. 21, 2007, pp. 275-287.

(56) References Cited

OTHER PUBLICATIONS

Unikernal. n.p., n.d. Web., downloaded from http://unikernel.org/ on Jul. 18, 2016, 3 pages.
Van De Ven, Arjan, "An introduction to Clear Containers," Eklektix, Inc., May 18, 2015, downloaded from https://lwn.net/Articles/644675/ on Jul. 15, 2016, 23 pages.
Wiki of the Xen Project. "Xen Networking," Jan. 26, 2016, downloaded from http://wiki.xenproject.org/wiki/Xen_Networking on Jul. 18, 2016, 12 pages.
Wikipedia, "iptables," Feb. 27, 2016, downloaded from https://en.wikipedia.org/wiki/Unikernel on Jul. 18, 2016, 2 pages.
Wikipedia, "Unikernels," Jun. 9, 2016, downloaded from https://en.wikipedia.org/wiki/Unikernel on Jul. 18, 2016, 4 pages.
U.S. Appl. No. 15/214,317, Published.
U.S. Appl. No. 15/214,321, Published.

\* cited by examiner

USING NANO-SERVICES TO SECURE MULTI-TENANT NETWORKING IN DATACENTERS

CROSS-REFERENCE TO RELATED APPLICATIONS

This application is a national stage of International Application No. PCT/IB2016/053990, filed Jul. 1, 2016, which claims the benefit of U.S. Provisional Application No. 62/310,572, filed Mar. 18, 2016, which are hereby incorporated by reference.

TECHNICAL FIELD

Embodiments of the invention relate to the field of datacenter configuration; and more specifically, to the use of nano-services to improve the security of tenants in the datacenter.

BACKGROUND

Datacenter service providers (IaaS) offer compute, storage and network resources to their customers by slicing physical hardware into virtualized tenant resources. Each tenant can subscribe to the datacenter services to obtain a required amount of virtualized compute, storage and network resources and utilize these resources based on their own requirements. Each tenant in the same datacenter expects isolation from other tenants even though underneath they share the same physical infrastructure. Tenant isolation is provided to the tenants through different mechanisms in cloud operating systems.

Isolating compute can be done through the hypervisor that manages the central processing unit (CPU) and memory resources in a server. Storage isolation can be provided by organizing physical volumes into logical volumes and granting access to these resources only to authorized tenants. Network resource isolation is a harder problem to solve as these isolated tenant networks need to reach the external networks through the same physical NIC and the datacenter switching infrastructure. It is easy to find security holes in the datacenter configuration by finding errors that lead to "information leaks" between the tenant networks.

This is why, for example, in datacenter platforms, such as OpenStack or similar software, tenants are permitted to configure their own security layer or security rules, such as in a security group. This security layer dictates what kind of traffic is allowed in and out through each individual virtual network interface controller (vNIC) in each Virtual Machine (VM) attached to the virtual network. In addition, OpenStack and similar datacenter platforms have default security rules and learning bridges to prevent spoofing attacks from VMs running in the datacenter. In a typical datacenter platform, the security layer is orchestrated through a set of Iptables. The Iptables hold filtering rules inside the hypervisor's kernel. Each vNIC interface will have its own set of Iptables rules that dictate which packets are passed in and out of the vNIC.

In addition to the security layer, datacenter platforms like OpenStack provide tenants with a set of L2 and L3 networking services in the form of L2 or L3 services, functions or agents, that tenants can utilize to support L2 protocols and create network auto-configuration (e.g., internet protocol (IP) address assignments), routing support (L3 reachability), firewall and other services (access control policies). In some cases, these agents provide dynamic host configuration protocol (DHCP), DHCPv6, IP routing and filtering features available in the operating system (OS) of the hypervisor and the isolation between these mechanisms is provided by the OS kernel features called namespaces. Namespaces enable these daemons and kernel features to function in isolation from each other.

SUMMARY

The embodiments include a method and system are provided for improving datacenter security by configuring a security layer as a set of nano-services that are executed to service a single tenant of the datacenter such that the nano-service protects the single tenant from other entities in the datacenter and the nano-service being compromised does not compromise the security of other tenants of the datacenter. The method includes receiving a request to instantiate a virtual resource for a tenant, generating a nano-service to implement at least one security layer function for the virtual resource, and connecting the nano-service to the virtual resource and a virtual bridge in the datacenter to enable communication between the virtual resource (vR) and a network of the datacenter with the security layer function processing traffic between the virtual resource and the virtual bridge. In some embodiments, the nano-service is immutable once it begins execution by a hypervisor of the datacenter. In further embodiments, the at least one security layer function is an L2 or L3 function.

In another embodiment, a method and system are provided for establishing secure virtual interface communication using nano-services to implement security layer functions in a hypervisor of a datacenter. The method includes receiving a request to establish a secure nano-session between a virtual network interface controller (vNIC) and a virtual resource (vR), generating a nano-service with a shared secret key pair between the vNIC and the nano-service, and encrypting the communication between the nano-service and the vR using the shared key established with the nano-service.

In further embodiments, an electronic device is provided within a datacenter architecture. The electronic device is configured to execute a method for improving datacenter security by configuring a security layer as a set of nano-services that are executed to service a single tenant of the datacenter such that the nano-service protects the single tenant from other entities in the datacenter and the nano-service being compromised does not compromise the security of other tenants of the datacenter. The electronic device includes a non-transitory computer-readable storage medium having stored therein a nano-service manager, and a processing device coupled to the non-transitory computer-readable medium having stored therein a nano-service manager, the nano-service manager configured to receive a request to instantiate a virtual resource (vR) for a tenant, to generate a nano-service to implement at least one security layer function for the virtual resource, and to connect the nano-service to the virtual resource and a virtual bridge in the datacenter to enable communication between the virtual resource and a network of the datacenter with the security layer function processing traffic between the virtual resource and the virtual bridge.

In another embodiment, a computer-readable storage medium has stored therein instructions that when executed cause an electronic device to implement a method for improving datacenter security by configuring a security layer as a set of nano-services that are executed to service a single tenant of a datacenter such that the nano-service protects the single tenant from other entities in the datacenter and the nano-service being compromised does not compromise the security of other tenants of the datacenter. The instructions cause the electronic device to perform a set of operations including receiving a request to instantiate a virtual resource (vR) for a tenant, generating a nano-service to implement at least one security layer function for the virtual resource, and connecting the nano-service to the virtual resource and a virtual bridge in the datacenter to enable communication between the virtual resource and a network of the datacenter with the security layer function processing traffic between the virtual resource and the virtual bridge.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
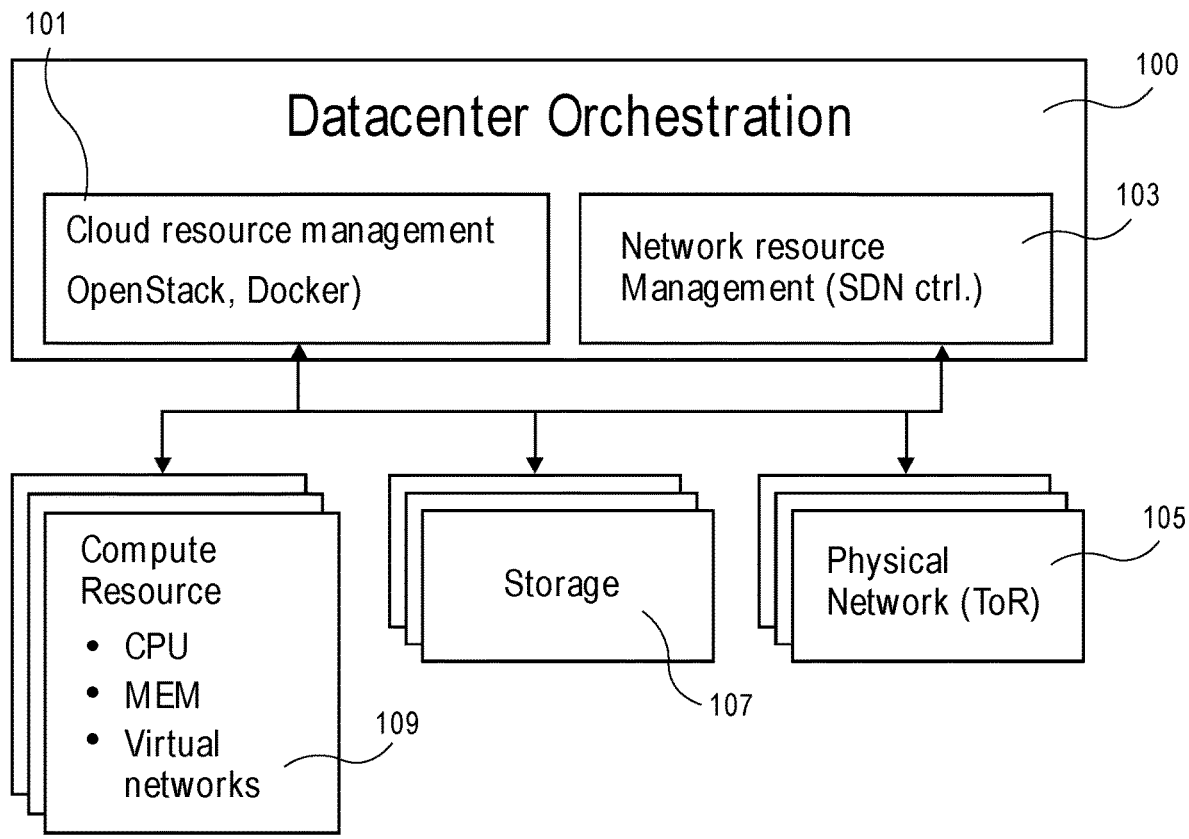
FIG. 1 is a diagram of one embodiment of a datacenter resources as managed by a datacenter orchestration component.

The following description describes methods and apparatus for a nano-service that provides a lightweight or shim layer between the tenants and the physical NICs to enhance the security of the tenant systems in place of the more vulnerable security layer of prior systems. A nano-service (NS) is a lightweight virtual machine (VM) that provides a full VM isolation through the hypervisor inside the OS kernel and which can be executed with a small resource footprint with a faster boot up times than traditional VMs, securely. This smaller footprint can be achieved by restricting the OS features inside the running nano-service VM. While traditional VMs provide full guest OS functionality for the users of the VM, the nano-service VM only provides bare minimum set of desired guest kernel features e.g. memory management, scheduling, boot loader. Anything more required by an application running inside the nano-service VM needs to be included by linking the application with the software libraries that can provide these features e.g. storage, networking, logging, etc. One way of implementing nano-services in the datacenter is similar to the functionality of unikernels. Unikernels come in different flavors, all which can be deployed as VMs inside a typical datacenter and have the desired support isolation and security with a much smaller resource footprint.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

In prior datacenter platforms, security layers are implemented as Iptables with rules in the hypervisors kernel. This means that the number of Iptable rules is directly proportional to the number of vNICs configured in the system and the number of security rules each tenant needs. In a node with large compute requirements this leads into huge number of rules that are hard to debug and maintain. When, for example, security rules are not properly removed, added or updated the overhead of these security rules becomes increasingly difficult to manage. In cases where VMs are restarted, migrated, or experience failures, the security layer and the security rules may be left improperly maintained. In addition, careless maintenance and configuration might lead to service interruptions on some or all tenants. For example, even if a datacenter administrator was trying to solve issues of a single VM/tenant, it may lead to disruptions to multiple tenants, because the security layer is a part of the hypervisor that manages all of the tenant systems. This is because Iptable commands used to manipulate rules are always executed with root permissions and all Iptable rules inside the hypervisor kernel are visible and shared by all the tenants residing on the compute node. Thus, careless operations often lead to creating security breaches for tenants sharing the resources in a virtualized environment of the hypervisor.

In some embodiments, to provide L2 or L3 services to tenants, the datacenter platforms, e.g., OpenStack, utilizes namespaces (e.g., Linux namespaces) to provide daemons and kernel features that are isolated from each other. While this makes it possible to have overlapping IP address spaces and routing tables in each namespace, this is not fully problem-free. The biggest issues in Linux namespaces are the known vulnerabilities and exploits that are known to exist in certain operating system (OS) and kernel versions. In addition, new exploits are always surfacing. At the same time, these namespaces can be used to directly connect to each tenant's VMs. An attacker gaining root access to a namespace has a direct path of attack to all the VMs connected to it. Also, the performance of the namespace based solution is questionable, as sending traffic through a namespace L3 services requires multiple traversals through the hypervisor's network protocol stack. If tenants configuring these L3 services are not using expert detailed deployment knowledge to setup these features, the performance might suffer considerably.

In addition, the existing solutions in datacenter platforms are not optimal when migrating VMs from one compute node to another. When migration happens, the rules and states associated with the security layer and the L2 or L3 functions, services or agents for the particular VM needs to be flushed and restored in the new location. In most cases datacenter platform control plane can handle this but the learned state is always lost, making the task of tenant VM migration very difficult.

Similar problems exist in other multitenant datacenter platforms, e.g., Docker, that currently do not provide any support for security groups for isolated L3 services. The embodiments of the invention described herein can overcome the limitations of the prior art and be used to introduce such services to these and other multitenant cloud platforms. In particular, the embodiments can overcome the limitations of security features to be deployed in the OS, hypervisor kernel, and namespaces, where there is no real isolation for security groups. The prior art platforms and security layer is prone to configuration errors. Prior art platforms have performance limitations when using Iptables and namespaces. Prior art platforms do not provide easy migration and some datacenter platforms do not support multitenant security and L2/L3 service features.

The embodiments of the invention overcome these limitations of the prior art. The embodiments provide a security layer and L2/L3 services without requiring shared OS kernel functionality. This is achieved by introducing nano-services (e.g., using unikernels) as dedicated virtual switches in the places where Iptables rules or namespaces are currently being used. For a security layer, the embodiments contain a single filtering nano-service (NS) that the tenants can configure through the same application programming interfaces (APIs) as existing datacenter platforms (e.g., via OpenStack APIs or Apcera APIs). Instead of resulting in a common shared set of Iptables rules, in the embodiments, these rules reside within the supporting nano-service itself.

To enable the nano-service based security layer, the embodiments separate the existing vNICs from directly attaching to the open virtual switch (OVS) or other virtual bridges into two components. One which connects between the virtual bridge and the nano-service, and the other which connects from the nano-service to the vNIC of the VM. This way, the packets between the VM and virtual bridge always traverse the nano-service. In the default case, the nano-service can bridge all packets between the two links but different security rules can also be added to filter out unwanted packets.

In the embodiments, L2 or L3 services can also be enabled for the tenants through the Nano-services mechanism instead of resorting to namespaces. For example, in order to replace the current L3 Agent namespaces in OpenStack, Nano-services are required that implement NAT, DHCP, DHCPv6, IPv4 and IPv6 routing and Firewall functions. These functions could be implemented by a single nano-service for all tenant VMs or the services could be segregated into separate nano-service instances each implementing the desired discrete functions only. The L3 nano-services can then be inter-connected to the correct tenants through the virtual bridge in the same fashion as the current L3 service namespaces are inter-connected.

The internal state of a nano-service can be made immutable, meaning that the internal state stays the same during the runtime of the nano-service. This provides truly secure execution, because outside influences cannot affect the internal state of the nano-service. At the same time, nano-services do not have a runtime environment for any administrator to login into. If the internal state needs to be updated the nano-service is stopped, a new state is "baked" into the image and the service is restarted. This is feasible as the nano-service can boot up quickly in milliseconds.

Migration of nano-services is also feasible as they are normally just a few megabytes (MB) in size. Each nano-service can be hibernated together with the internal state and shipped to the new location with the VM that is being migrated. In the new location the nano-service is restarted with the preserved configuration of the vNICs and the internal state maintained by the nano-service.

Thus, the nano-services described by the embodiments provide an isolation of the security layer enforcement and L2 or L3 services by orchestrating or organizing them into their own virtualized resource. Each network interface of a VM is passed through a filtering nano-service that will hold the filtering state internally. L2 and L3 services are implemented as software features in the nano-service and tenants are inter-connected to them in the same way as existing datacenter platforms, through the virtual bridge. The embodiments, provide true security through an immutable execution environment. Migration of the security layer functions and rules and L2 and/or L3 services is feasible using the nano-services. Nano-services are hibernated and copied to the new location along with the VM and restarted at the desired new location.

The embodiments provide many advantages over the prior art. The embodiments use nano-services instead of Iptables (or other IP filtering mechanisms) or namespaces to provide the same and extended services as the security layer and L2 and/or L3 functions, service sand agents of the current multitenant cloud deployment or datacenter platform. The embodiments avoid using the shared hypervisor resources for the security layer, thereby increasing the security and simplicity of the configuration and maintenance of the security layer.

System administrators of a tenant maintain and configure rules inside a single NS and any mistake made during this activity only affects the current vNIC or L2/L3 service of that tenant. Moreover, these rules can be made available to the tenant administrators without full root privileges to the hypervisor. A tenant will only have visibility into the nano-services of that tenant and no visibility at all into any other co-located tenant nano-services or otherwise.

In the embodiments, the attack surface (i.e., the possible routes or openings for malicious access) of a NS is much smaller than that of the hypervisor OS and kernel or the namespaces within it. NSs do not have privileged users within them or have ways for administrators to login to them and change things inside them with command line interface (CLI) commands. This enables immutable execution which leads to truly secure execution of the security group filtering and L2/L3 services.

In the embodiments, migration of VMs is facilitated and can support migration of the internal state. NSs can be migrated together with the migrating VM as they are small in size and boot up quickly. The ability to migrate internal state for certain L2/L3 services like Ethernet, Point-to-Point Protocol (PPP), firewall (FW) and network address translation (NAT) enables migration with minimal service interruptions as the state does not need to be re-learned.

Thus, the embodiments provided via the nano-services support true isolation from the hypervisor OS and between other nano-services, in particular between the nano-services of separate tenants, improves the maintenance and configuration and leads to less service interruptions. The embodiments provide greater security of the datacenter system as a whole; attack surfaces for tenants are smaller, in particular with enablement of immutable infrastructure such as the immutable nano-services. In the architecture of the embodiments, migration is easier and migration of internal state (e.g. FW, NAT) is supported. The embodiments do not demand changes to the existing physical or virtual networking functionality of the datacenter platform. The embodiments do not demand changes to the management APIs of the cloud manager in the datacenter platform. In the embodiments, nano-services offer enhanced functionality compared to existing Iptables (e.g. other virtual network function (VNF) or VNF chains are possible). The embodiments architecturally allow for gradual migration of VMs based VNFs into full or partial unikernel (UK) based VNFs.

FIG. 1 is a diagram of one embodiment of datacenter hardware resources as managed by a datacenter orchestration component 100. Example implementations of the cloud resource management 101 software are OpenStack, Apcera and similar cloud resource management software. Network resource management 103 can be included in the cloud resource management 101 software via a network virtual manager, e.g., Neutron, in OpenStack or a separate management system for networking. For example, an SDN controller (e.g. OpenDaylight, ONOS) or similar component can be utilized.

Cloud resource management 101 is responsible for rationing the computer resources 109 (e.g., processing devices such as central processing units (CPUs) and memory) and storage 107 resources of a datacenter via the hypervisor/virtual machine manager (VMM) (e.g. KVM, Xen). It provides APIs for cloud and tenant administrators to create new virtual Resources (vR) e.g. VMs, containers, and even nano-services, and similar services. These APIs are also used to create, manage and monitor tenant specific storage clusters and other aspects of the virtualized infrastructure.

The network resource management 103 component is used to manage both the physical 105 and virtual network resources 109. Network resource management provides APIs for administrators to create new virtual networks and connect them to the physical switching fabric with different means. In addition, this component provides required network security and L3 service APIs for tenants to deploy NAT, DHCP, routing, and FW services to the virtual networks.

The computer resources 109 can include any number, variety and organization of central processing units as well as working memory in which the processes and programs described in relation with the embodiments of the invention are implemented. The compute resources 109 can be in communication with the storage 107, which can be any type of computer-readable medium (e.g., optical, magnetic, solid-state or similar storage technology) in which the code for the processes described with regard to the embodiments is stored. Similarly, the compute resources 109 and storage 107 can be in communication with one another and with other devices outside of the datacenter hardware via the physical network 105 and external networks.

In some embodiments, the datacenter is implemented as a set of electronic devices (e.g., a set of datacenter servers). An electronic device stores and transmits (internally and/or with other electronic devices over a network) code (which is composed of software instructions and which is sometimes referred to as computer program code or a computer program) and/or data using machine-readable media (also called computer-readable media), such as machine or computer-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 2:
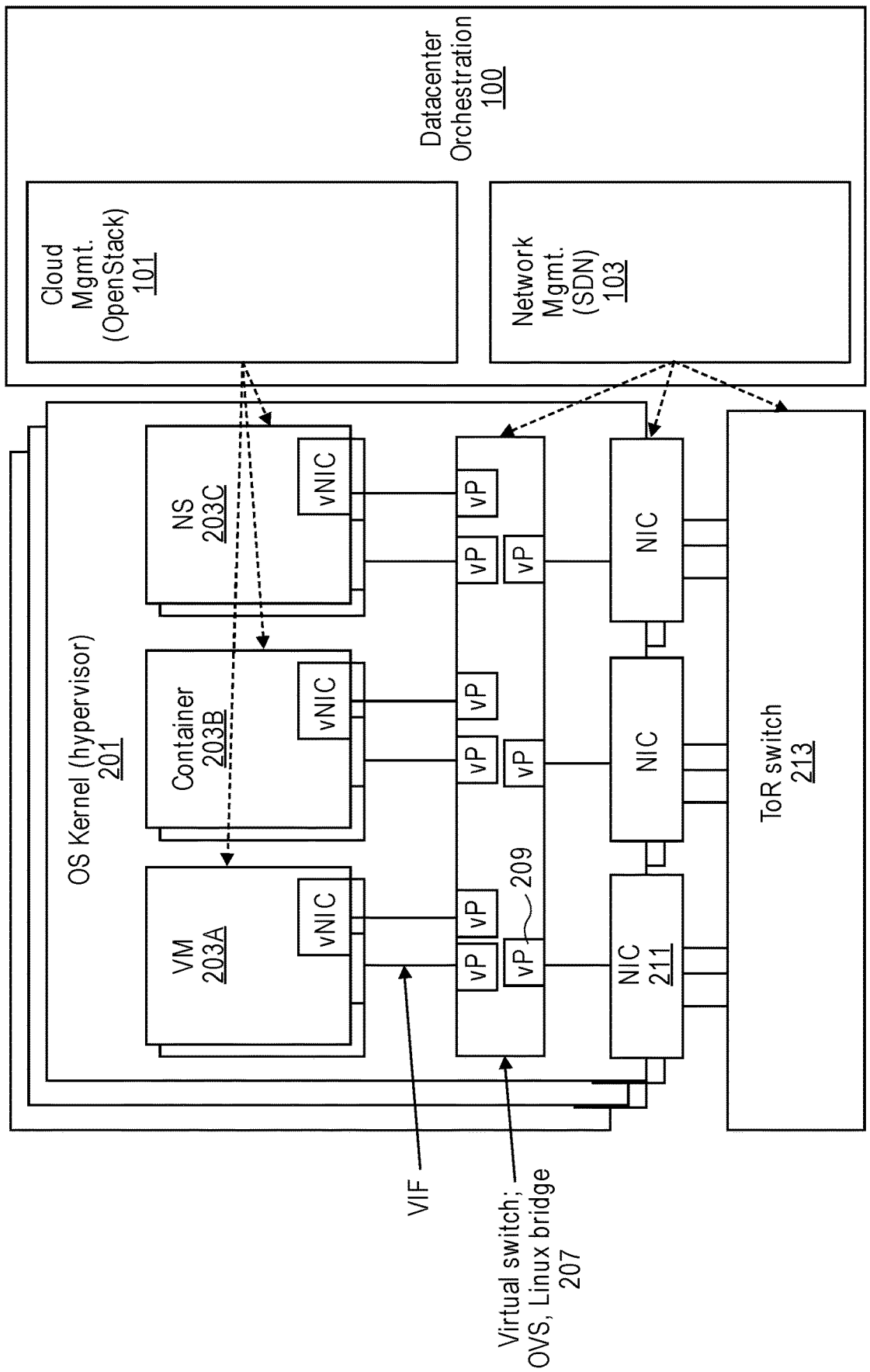
FIG. 2 is a diagram of one embodiment of networking in a datacenter.

FIG. 2 is a diagram of one embodiment of networking in a datacenter. A typical example of how virtual networks are configured inside a datacenter and inside a single hypervisor (e.g., Linux OS) is shown. Each virtual resources (vR), such as virtual machines 203A, containers 203B, and NSs 203C, is created with a corresponding virtual NIC (vNIC). The vNIC interfaces can be used by the vR to communicate with the outside world. Internally in the vR, the vNIC appears to the OS 201 as a normal physical NIC and the same drivers can be used to configure it inside the guest kernel. However, there is no physical hardware or cables attached directly to the vNIC. Instead the hypervisor 201 is needed to attach the vNIC to a physical NIC 211 in order to connect the vR to the outside world. This is normally achieved through the use of virtual bridges 207 (e.g., an OVS, Linux Bridge) that are configured inside the hypervisor 201. Each vNIC is connected to a virtual Port (vP) 209 inside the virtual bridge with a connection sometime referred as Virtual Interface (VIF) (e.g., virtio, netfront and-back). The virtual bridge (or virtual switch) 207 also connects the physical NICs 211 and the virtual bridges' packets between vPs 209 leading up to the vRs 203A-C and vPs 209 leading down to the physical NICs 211. Each hypervisor server 201 is then connected to a Top of the Rack (ToR) switch 213 that can connect multiple hypervisors to form larger tenant clusters. In addition, the ToR switch 213 extends the connectivity out from the datacenter which is used to reach the Internet with possibly the help of a datacenter gateway.

Figure 3B:
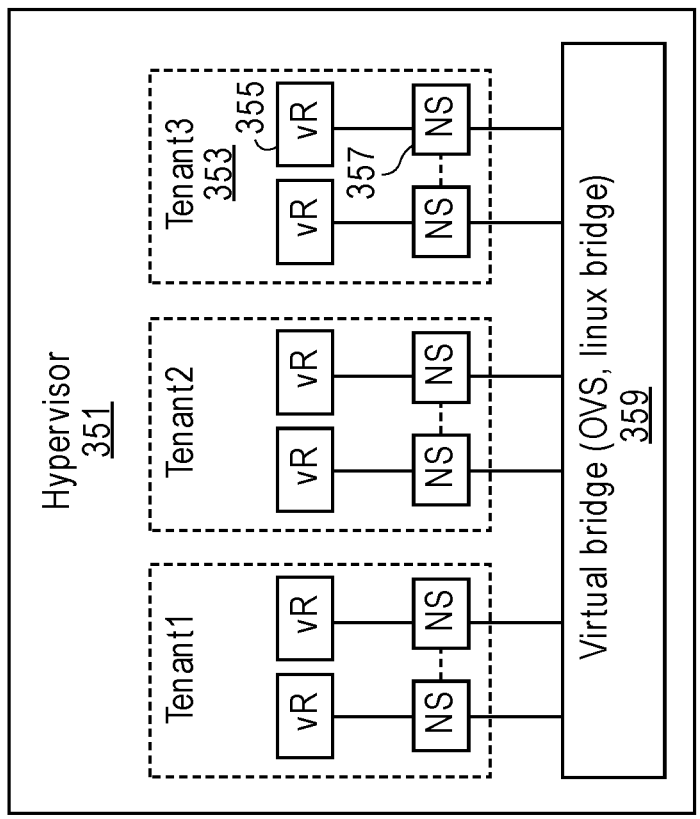
FIG. 3B is a diagram of one embodiment of a hypervisor in an architecture employing nano-services.
Figure 3A:
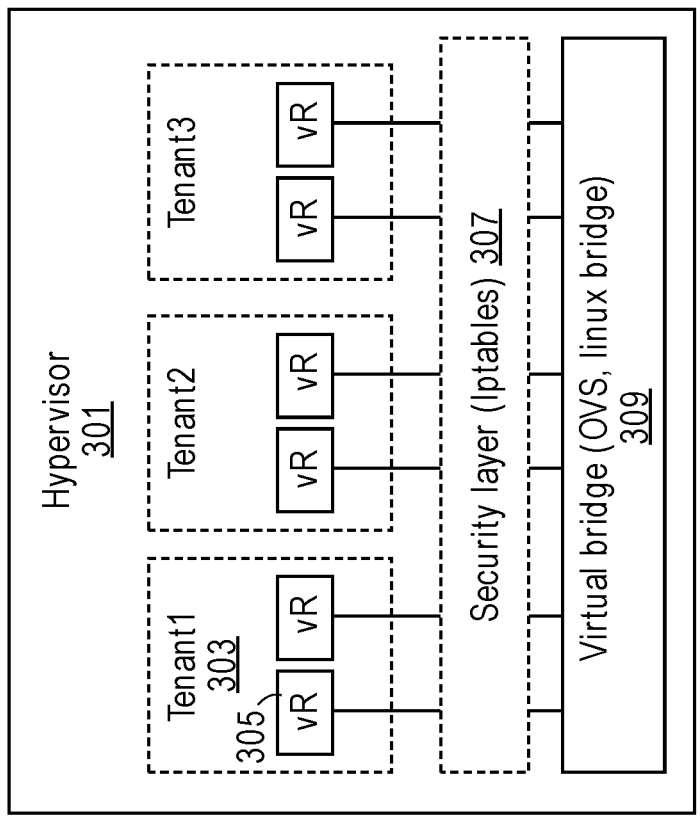
FIG. 3A is a diagram of a hypervisor with a conventional security layer.

FIGS. 3A and 3B are diagrams of a hypervisor according to prior datacenter platforms and example embodiments of the datacenter platform. FIG. 3A is a diagram of a hypervisor with a conventional security layer. e.g., in an OpenStack architecture. The diagram shows how a security layer is configured on a standard hypervisor compute node. Each VIF from a vR 305 is passed through virtual bridges 309 where Iptables rules are used to filter traffic exiting and entering each vNIC. In addition, media access control (MAC) spoofing is disallowed with MAC address learning and L2 filtering rules. All Iptables rules are installed into the hypervisor kernel which leads to a large filter rules set that is configurable by anybody with the correct privileges (normally as the root user).

In this illustration, vR indicates virtual Resource (e.g., VM, container, Nano-service), and NS indicates a nano-service. In this architecture, the hypervisor 301 supports a set of tenant platforms 303, these tenant platforms 303 can include any combination of vRs such as virtual machines, nano-services, or containers. The vR 305 communicate with the security layer 307 to reach outside networks via the virtual bridge 309. However, as discussed above this security layer 307 executed by the hypervisor 301 is a potential security risk.

FIG. 3B is a diagram of one embodiment of a hypervisor in an architecture employing nano-services. The embodiments provide a mechanism that provides isolation to the security layer rules by installing these rules into a nano-service 357 that is connected to each VIF as shown in FIG. 3B. The nano-service 357 is within the tenant platform 353 where each vR 355 can be matched with at least one nano-service 357. The cloud resource management API that configures the security layer can remain the same and instead configure the nano-services. The backend for this embodiment has now been changed from Iptables to a set of NSs. Each NS will implement the specific filtering mechanism for each VIF. The configuration for the NS can also be isolated so that only the tenant administrator has access to configure filtering rules. In addition, configuration mistakes inside a single NS cannot cause problems to other VIFs as the filtering set is only applicable to traffic within the NS.

Figure 4:
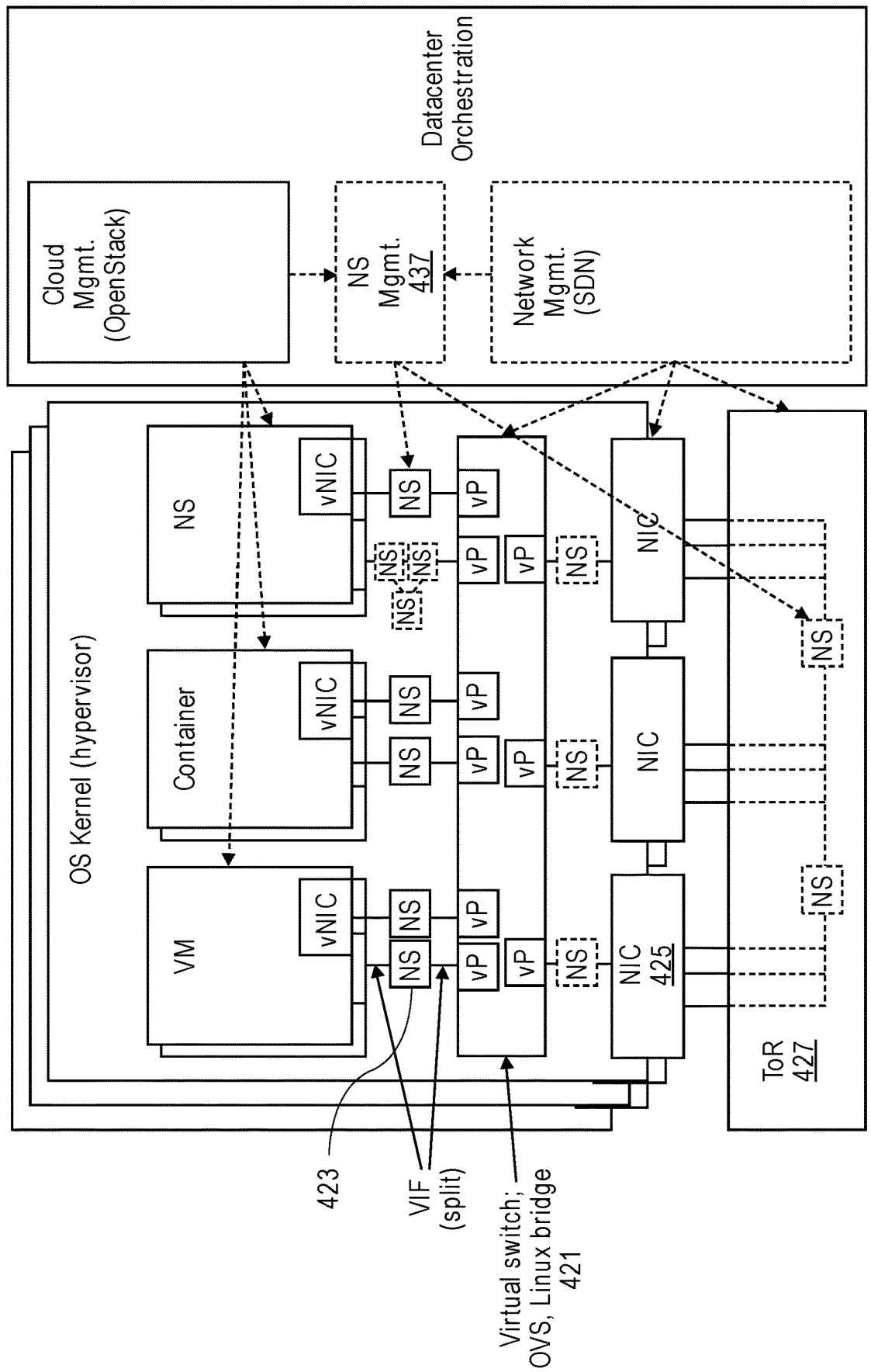
FIG. 4 is a diagram of one embodiment demonstrating the deploying of nano-services for tenant network security layer governing.

FIG. 4 shows how the nano-services responsible of security group filtering are deployed in a virtual networking architecture. Each VIF between the virtual bridge and vR is split into two VIFs that are connected through the NS. For the vR or virtual bridge this is fully transparent and there is no need to do any change for them to support this feature. The cloud and network management entities need to be able to create the NSs together with vR vNICs and VIFs and connect them correctly to enable network traffic. This requires changes to the backend of these management components but the APIs provided to the users could remain the same. Then any management and orchestration system can be utilized in deploying and configuring this architecture.

FIG. 4 also shows additional possibilities to deploy filtering NS 423 to do packet filtering in different places in the datacenter networks. NS 423 can be deployed between physical NIC 425 and virtual bridge 421 enabling tenant control for filtering directly on physical resources. In addition, the same mechanism can be deployed in the ToR switch 427 that normally does not provide Iptables support (this is possible if the ToR provides an execution environment for NSs). This way the filtering can save some virtual resources down the path. As mentioned above, to orchestrate NSs a nano-service manager 437 is needed that will be in charge of creating NSs and configuring them. The detailed functionality of the NS management entity 431 can encompass any protocols and systems compatible with the datacenter platform.

Figure 5:
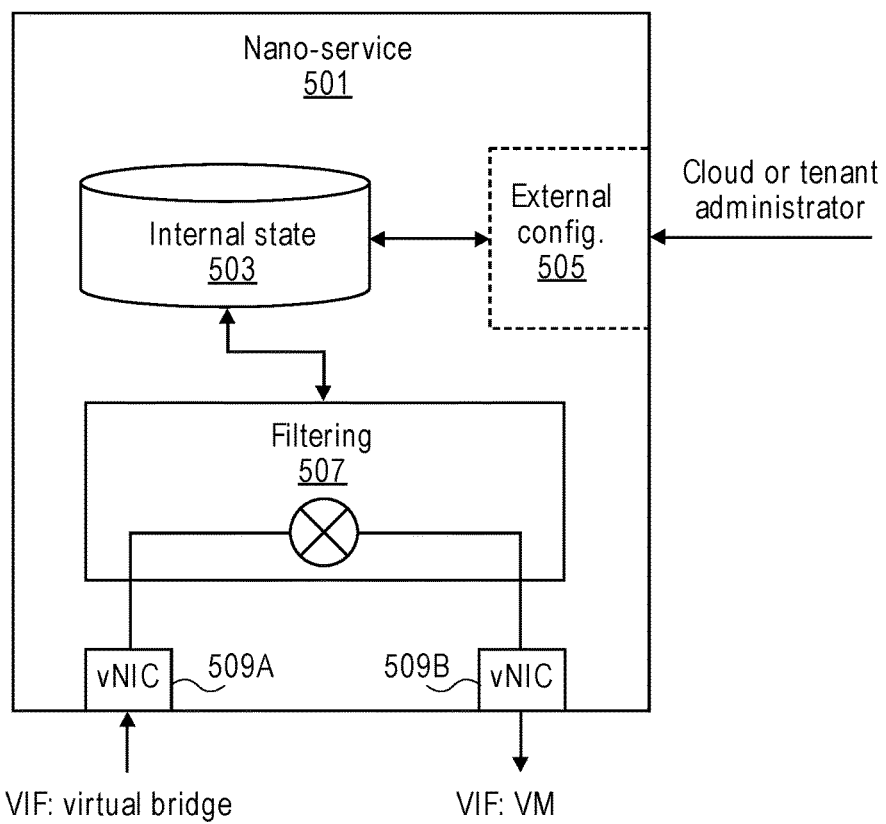
FIG. 5 is a diagram of one embodiment of a nano-service software architecture to implement security layer functionality.

FIG. 5 is a diagram of one embodiment of a nano-service software architecture to implement security layer functionality. The software for filtering traffic in the NS can be implemented in many different ways. FIG. 5 shows a logical architecture for a filtering NS. The NS requires two vNICs 509A, B that are connected to the vR and the virtual bridge. Internally, the vNICs 509A, B are connected through a bi-directional filtering function 507. The filtering function will inspect each packet flowing through it and based on internal state make a decision whether to drop the packet or forward it. Internal state for the filtering is kept in an internal storage 503. The internal storage 503 is only accessible to the NS and cannot be read or written to by other entities. To add state to the internal storage the NS may (optionally) expose an interface 505 for the administrator to add and remove the filtering rules. However, the presence of this interface reduces security, if this interface is not present then the NS 501 is immutable. The NS 501 can be orchestrated without the external interface making it even more secure. In this case when the NS 501 is created, the filtering rules are compiled into the NS image. If any changes to these rules are needed, the NS 501 needs to be recompiled with the new set of rules and deployed in a make before break fashion. This will provide the most secure execution environment, as the deployed NS s will now be immutable.

Figure 6A:
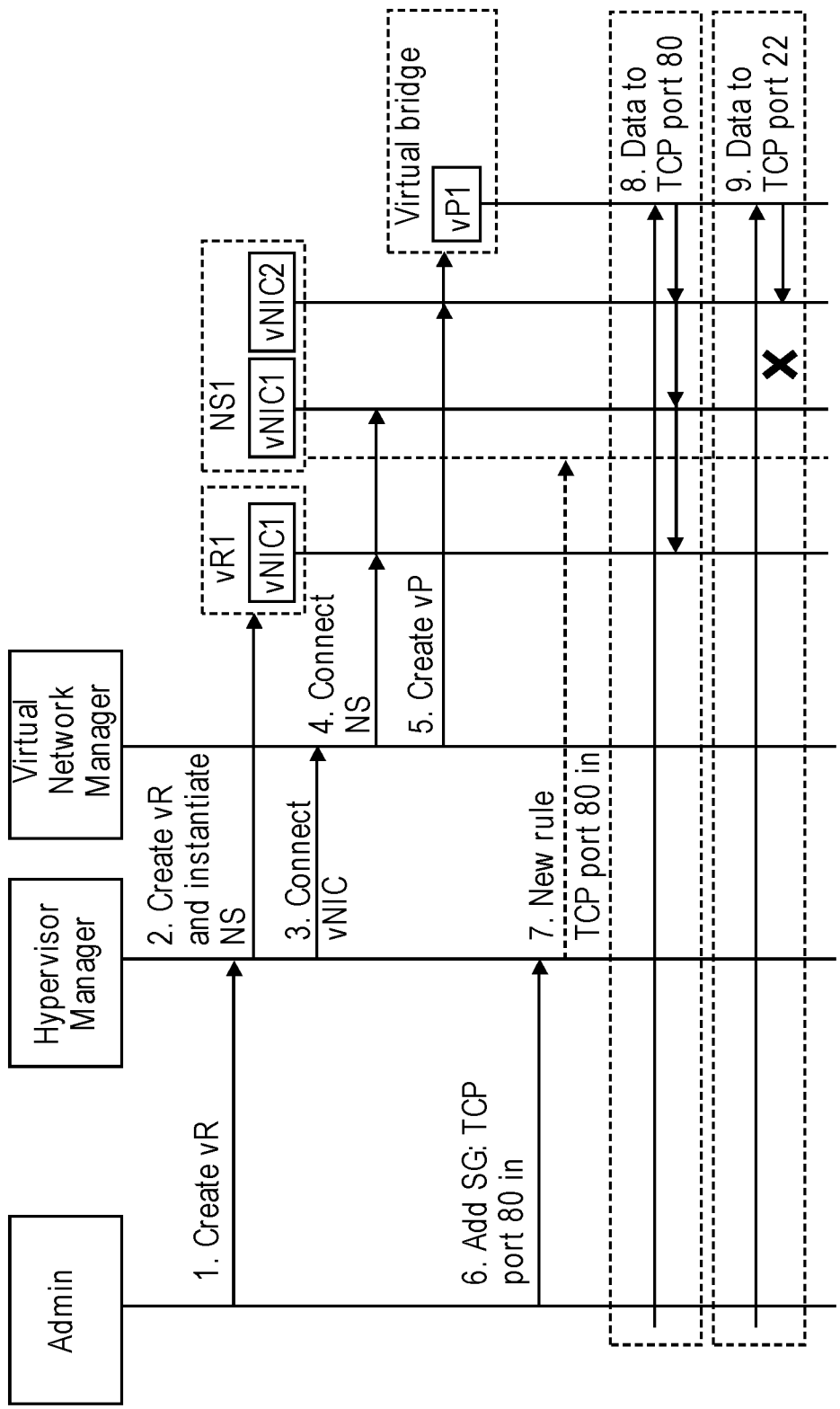
FIG. 6A is a timing diagram of one embodiment of a process for deploying the filtering NS.

FIG. 6A is a timing diagram of one embodiment of a process for deploying the filtering NS. In a first step, when and administrator desires a new vR the admin requests the vR from a hypervisor manager, e.g., OpenStack Nova. The hypervisor manager will create the vR together with the requested vNICs. As part of this process the hypervisor manager will also instantiate the filtering NS and create the vNICs for it as well. In a third step, the hypervisor manager will then request a network virtual manager to connect the vR to the virtual bridge. The network virtual manager will connect the vR to the filtering NS by connecting the two vNICs. The virtual network manager will create a new vP to the virtual bridge and connect the filtering NS to the vP.

An administrator can add security layer (SG) rules to the filtering NS through APIs provided by the hypervisor manager. In the figure, the administrator opens a connection to TCP port 80 by way of example, however any port could be utilized. The hypervisor manager will send the filtering rules to the NS through the external management interface. In other embodiments, where the NS is immutable, the NS at the time it is instantiated must include the SG rules or the NS must be re-instantiated. In this example, data packets to TCP port 80 reach the vNIC in the vR. The data packets to TCP port 22 are dropped in the filtering NS.

An NS can also be used to provide L2 and/or L3 services to the tenant networks. These can be orchestrated similarly as today's L2 and/or L3 services but instead of executing them in the hypervisor OS or namespaces the embodiments support providing isolation to them by packaging them as NSs.

Figure 6B:
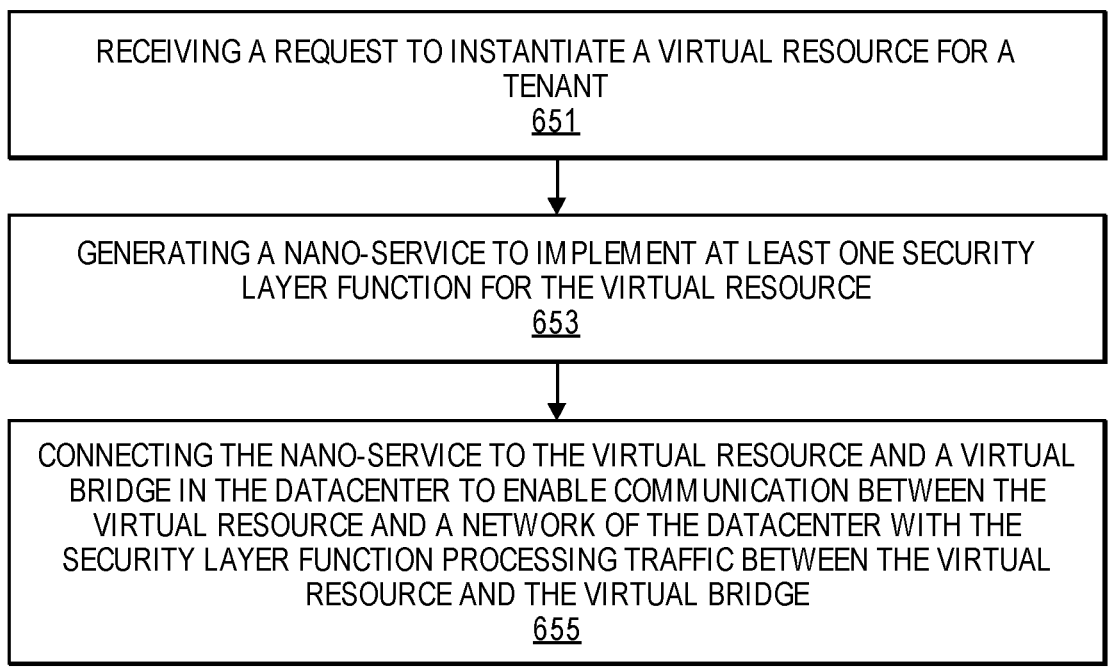
FIG. 6B is a flowchart of one embodiment of a process for deploying NS.

FIG. 6B is a flowchart of one embodiment of a process for deploying NS. This flowchart provides a generalized implementation of the deployment process for NS in a datacenter. The method illustrated is implemented by a hypervisor executed by an electronic device in the datacenter for improving datacenter security by configuring a security layer as a set of nano-services that are executed to service a single tenant of the datacenter such that the nano-service protects the single tenant from other entities in the datacenter and the nano-service being compromised does not compromise the security of other tenants of the datacenter. The process may be initiated in response to receiving a request to instantiate a virtual resource for a tenant (Block 651). This request can have any origin such as an administrator in the datacenter. In response to the request, the process generates a nano-service to implement at least one security layer function for the virtual resource (Block 653). Once generated the process connects the nano-service to the virtual resource and a virtual bridge in the datacenter to enable communication between the virtual resource and a network of the datacenter with the security layer function processing traffic between the virtual resource and the virtual bridge.

Figure 7B:
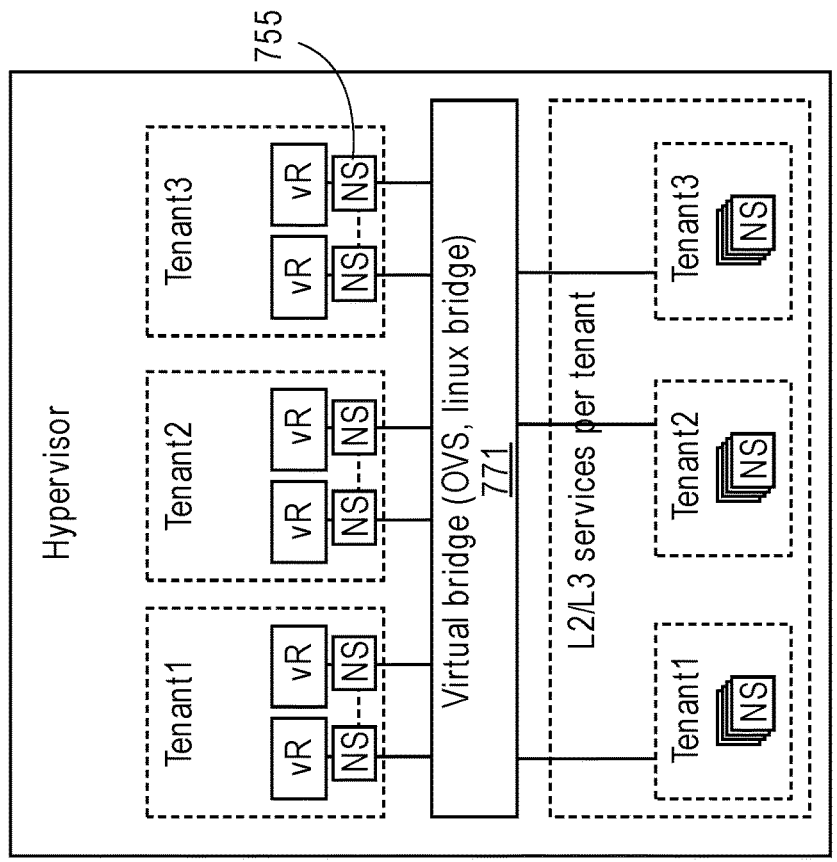
FIG. 7B is a diagram of one embodiment of a hypervisor supporting the isolating of L2/L3 services into NSs.
Figure 7A:
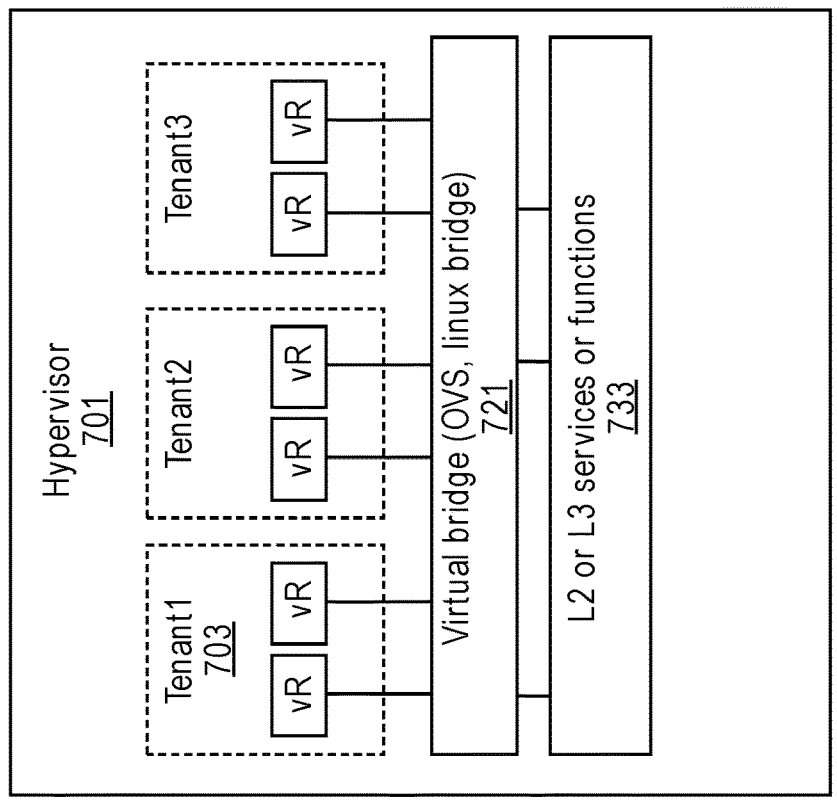
FIG. 7A is a diagram of one embodiment of a hypervisor supporting L2 or L3 functions, services or agents in a standard architecture.

FIG. 7A is a diagram of one embodiment of a hypervisor supporting L2/L3 functions and services in a standard architecture. The figure shows how L2/L3 services are deployed in the standard datacenter networks. Each tenant 703 will require its own set of L2/L3 services 733 (e.g., L2: Ethernet, Point to Point Protocol (PPP), L3: Network Address Translation (NAT), firewall (FW), routing, dynamic host configuration protocol (DHCP)) and tenant networks 703 are connected to these services through the virtual bridge 721. The services themselves can be running as userspace daemons directly on the hypervisor OS 701 or isolated into namespaces to prevent conflicts between the services.

FIG. 7B is a diagram of one embodiment of a hypervisor supporting the isolating of L2/L3 services into NSs. The embodiments provide clearer administrative boundaries to these services and hence greater security. In addition, tenant administrator will not need APIs that configure the hypervisor resources with root privileges. Each NS 755 can be reached with tenant privileges and any misconfiguration is isolated within the NS 755 and does not cause service disruption to other tenants or even to other services within the same tenant.

Figure 8:
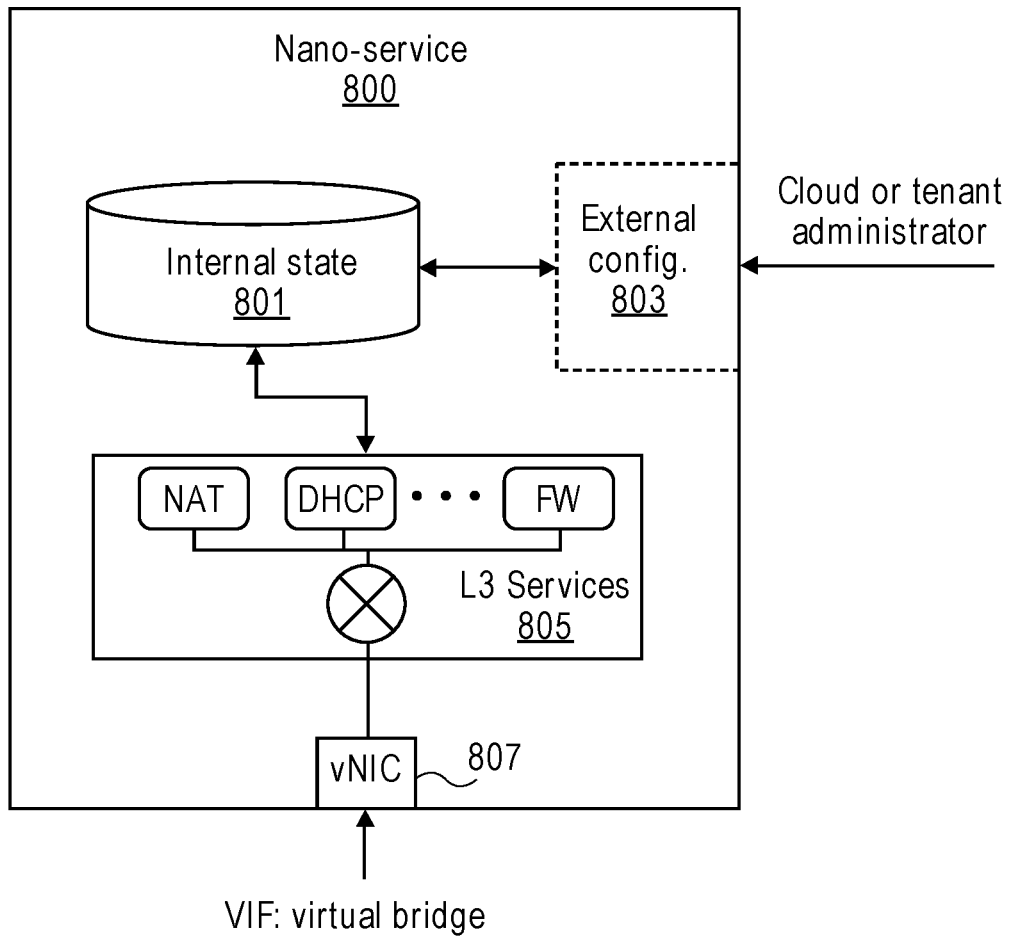
FIG. 8 is a diagram of one example embodiment of the nano-switch architecture to implement a L3 service.

Internally, a L2 and/or L3 service NS 755 can be architected in a similar way as the filtering NS of the FIG. 8 described herein below. FIG. 8 is a diagram of one embodiment of the nano-switch architecture to implement an L3 service. The L3 service NS only needs a single vNIC 807 that is connected to the virtual bridge 771. Inside this vNIC 807, packets can be de-multiplexed to each of the L3 service software components through a filtering function 805 that can inspect it and select the correct software component based on the packet-headers. Internal state 801 required for these software components to function is kept inside the NS and external entities will not be provided any read or write access to it. To configure the internal state 801, the NS can provide an external API 803 to the administrator. Alternatively, the configuration state can be compiled into the NS image. Each L3 service can also use the internal storage 801 to store the current state. For this purpose, the memory of the L3 service NS needs to be budgeted beforehand with enough space for the desired functionality, for example, FW, or NAT may require different amounts of memory.

The internal software logic needs to take care of the next hop decision for the outgoing packets from the NS. For example, the routing table entries inside the NS will dictate the next hop L2 address. The routing software needs to rewrite the correct L2 destination address before passing the packet out as the virtual bridge will need this information to forward the packet out through the correct vP through which this L2 destination address is accessible. To make L3 services more scalable they can be deployed in multiple NSs based on the service load. In this case, the internal state needs to be shared and the packet I/O load balanced between the different NSs. The details of such deployment is left outside of the scope of this invention.

Figure 9:
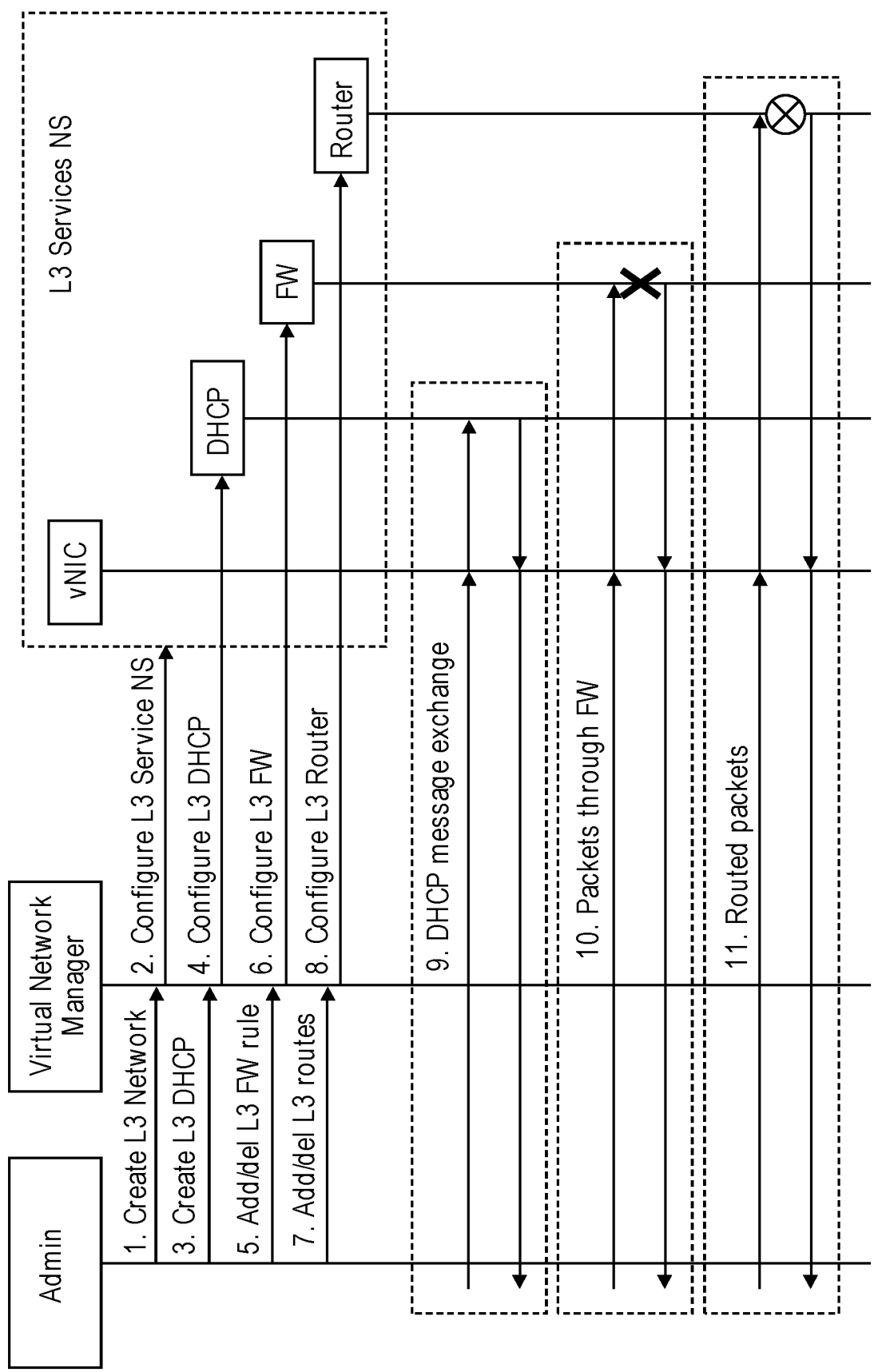
FIG. 9 is a timing diagram of one example embodiment of a process for deploying L3 services using nano-services.

FIG. 9 is a timing diagram of one embodiment of a process for deploying L3 services using nano-services. In one embodiment, first the administrator creates a L3 tenant network. The virtual network manager creates a L3 service NS and connects the vNIC to the virtual bridge. The administrator configures DHCP service. The virtual network manager will collect IP information (subnets, DNS server, default router, etc.) for a particular tenant network and configure this information into the L3 Service NS. In addition, the virtual network manager will configure a virtual bridge to pass DHCP requests to the L3 service NS.

In one embodiment, the administrator adds or removes FW rules. The virtual network manager will pass these rules to the correct L3 service NS. The administrator adds or removes IP routes. The virtual network manager will configure these routes to the correct L3 service NS. DHCP requests coming from tenant network are passed to the DHCP software component that creates correct reply from the configured internal state. The packets through the FW are passed to the filtering software that can either drop or forward the packets. The packets for L3 routing are passed to the L3 service NS and routing decision is performed and L2 destination address rewritten based on configured routes.

The example embodiments of FIG. 8 and FIG. 9 provide L3 service support and deployment. However, these embodiments are provided by way of example and not limitation. The principles, processes and structures can also be applied to support and deploy L2 services and functions in similar contexts.

Figure 10:
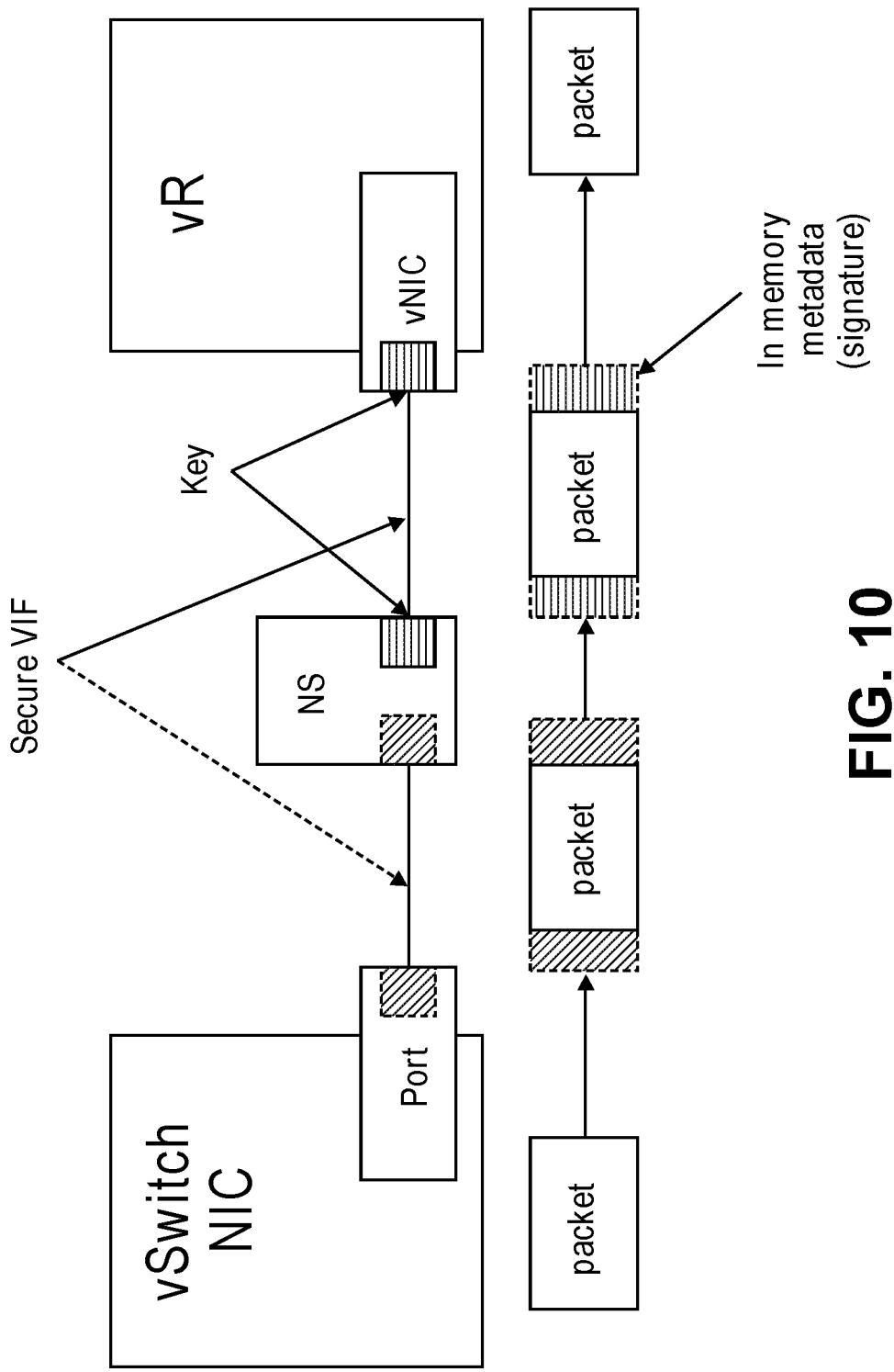
FIG. 10 is a diagram of one embodiment of architecture to protect the VIF from attack.

To protect the vR against attacks coming from compromised hypervisor the VIF between the vNIC and the NS can be further secured by mandating strict integrity protection over the data written over the VIF. FIG. 10 is a diagram of one embodiment of architecture to protect the VIF from attacks. This can be achieved by binding a shared secret key pair between the vNIC and NS when these are created. Any mechanism to compute shared keys can be utilized. By installing these keys within the vR and the NS, it ensures that the hypervisor kernel cannot access them, therefore, they are not compromised if the hypervisor is. Once the keys are in place the NS and vR must provide integrity protection to the packets originated by them. When receiving a packet each entity can perform the integrity check. If the integrity check fails, then the receiver can drop the packets in order to block malicious traffic. The same approach could also be applied to secure the binding between the NS and the vSwitch.

Figure 11:
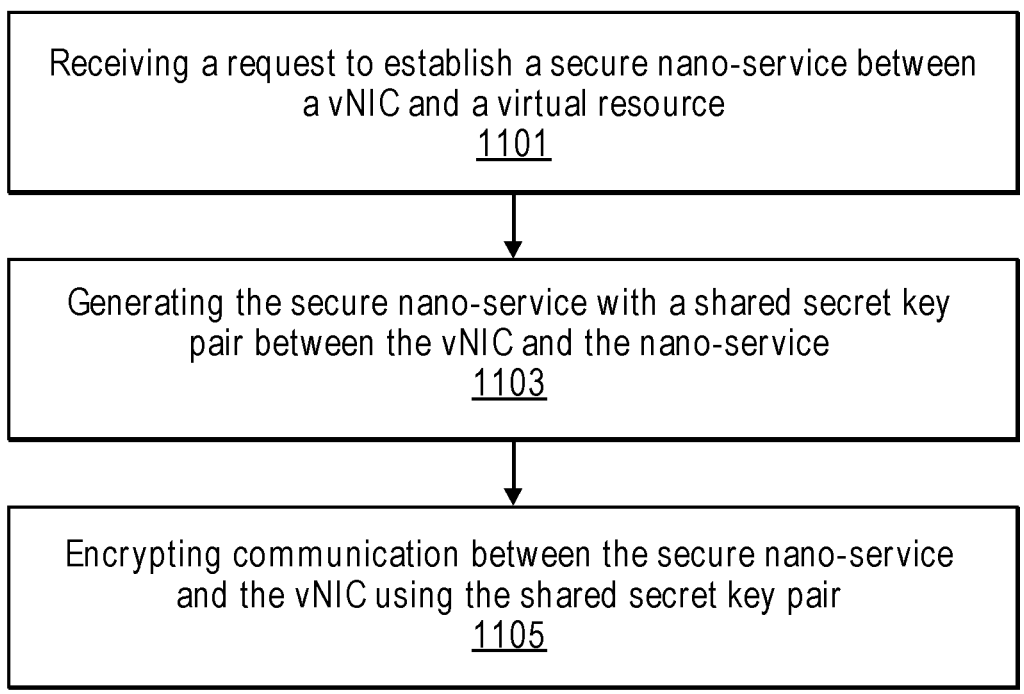
FIG. 11 is a flowchart on one embodiment of the process for establishing secure VIF communication.

FIG. 11 is a flowchart on one embodiment of the process for establishing secure VIF communication. The process may be initiated in response to receiving a request to establish a secure nano-session between a vNIC and a virtual resource (Block 1101). The secure nano-service with a shared secret key pair between the vNIC and the nano-service is then generated (Block 1103). With the shared key established with the nano-service, the communication between the nano-service and the vR can be encrypted (Block 1105).

Using Nano-services (NSs) implemented as unikernels or similar structure (to deploy security group filtering and L2 and/or L3 services in a datacenter) provides better isolation and security to tenants than implementing them inside the hypervisor kernel as it is done in the prior art. Such isolation improves the robustness of the overall system and minimizes the effect of configuration and other errors. In addition, NSs minimize the attack surface to almost zero. Even if the hypervisor OS is compromised, the attacker cannot reach the protected resources (VMs) as the connection is going through a protected and isolated NS.

While embodiments have been described that implement L2 and/or L3 services using nano-services, one skilled in the art would appreciate that this is provided by way of example and not limitation. Functions at the L2-L7 or similar functions can also be similarly implemented by using nano-services that isolate these functions from being relied upon by multiple tenants thereby decreasing security risks to tenants of the datacenter. These higher level functions can include quality of service (QoS)/queue management/rate limiting, probing, lightweight analytics, metering, and similar services.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for improving datacenter security by configuring a security layer as a set of nano-services, the method comprising:
   receiving a request to instantiate a virtual resource (vR) for a tenant;
   generating a nano-service to implement at least one security layer function for the virtual resource; and
   connecting, in the datacenter, the nano-service to the virtual resource and a virtual bridge enabling communication between the virtual resource and a network of the datacenter with a security layer function processing traffic between the virtual resource and the virtual bridge, the security layer function being implemented by the nano-service,
   wherein for each virtual resource of the tenant a corresponding nano-service is provided, and for each nano-service a connection is established between the virtual bridge and the corresponding nano-service, and a connection from the corresponding nano-service to the virtual resource, each nano-service having its own filtering rules.

2. The method of claim 1, wherein the nano-service is immutable once it begins execution by a hypervisor of the datacenter.

3. The method of claim 1, wherein the at least one security layer function is an L2 function or an L3 function.

4. The method of claim 1, wherein the method further establishes secure virtual interface communication using nano-services to implement security layer functions in a hypervisor of the datacenter, the method comprising:
   receiving a request to establish a secure nano-session between a virtual network interface controller (vNIC) and the virtual resource;
   generating the nano-service with a shared secret key pair between the vNIC and the nano-service; and
   encrypting the communication between the nano-service and the vR using the shared key established with the nano-service.

5. The method of claim 1, wherein the nano-service includes an interface for receiving configuration information from a hypervisor or a network administrator.

6. An electronic device within a datacenter architecture, the electronic device configured to execute a method for improving datacenter security by configuring a security layer as a set of nano-services, the electronic device comprising:
- a non-transitory computer-readable storage medium having stored therein a nano-service manager; and
- a processing device coupled to the non-transitory computer-readable medium having stored therein a nano-service manager, the nano-service manager configured to receive a request to instantiate a virtual resource (vR) for a tenant, to generate a nano-service to implement at least one security layer function for the virtual resource, and to connect, in the data center, the nano-service to the virtual resource and a virtual bridge enabling communication between the virtual resource and a network of the datacenter with a security layer function processing traffic between the virtual resource and the virtual bridge, the security layer function being implemented by the nano-service,
- wherein for each virtual resource of the tenant a corresponding nano-service is provided, and for each nano-service a connection is established between the virtual bridge and the corresponding nano-service, and a connection from the corresponding nano-service to the virtual resource, each nano-service having its own filtering rules.

7. The electronic device of claim 6, wherein the nano-service is immutable once it begins execution by a hypervisor of the datacenter.

8. The electronic device of claim 6, wherein the at least one security layer function is an L2 function or an L3 function.

9. The electronic device of claim 6, wherein the nano-service manager is configured to further establish secure virtual interface communication using nano-services to implement security layer functions in a hypervisor of the datacenter, the nano-service manager further configured to receive a request to establish a secure nano-session between a virtual network interface controller (vNIC) and the virtual resource, to generate the nano-service with a shared secret key pair between the vNIC and the nano-service, and to encrypt the communication between the nano-service and the vR using the shared key established with the nano-service.

10. The electronic device of claim 6, wherein the nano-service includes an interface for receiving configuration information from a hypervisor or a network administrator.

11. A non-transitory computer-readable storage medium having instructions stored therein that when executed cause an electronic device to implement a method for improving datacenter security by configuring a security layer as a set of nano-services that are executed to service a single tenant of a datacenter such that the nano-service protects the single tenant from other entities in the datacenter and the nano-service being compromised does not compromise security of other tenants of the datacenter, the instructions causing the electronic device to perform a set of operations comprising:
- receiving a request to instantiate a virtual resource (vR) for a tenant;
- generating a nano-service to implement at least one security layer function for the virtual resource; and
- connecting, in the data center, the nano-service to the virtual resource and a virtual bridge enabling communication between the virtual resource and a network of the datacenter with a security layer function processing traffic between the virtual resource and the virtual bridge, the security layer function being implemented by the nano-service,
- wherein for each virtual resource of the tenant a corresponding nano-service is provided, and for each nano-service a connection is established between the virtual bridge and the corresponding nano-service, and a connection from the corresponding nano-service to the virtual resource, each nano-service having its own filtering rules.

12. The non-transitory computer-readable storage medium of claim 11, wherein the nano-service is immutable once it begins execution by a hypervisor of the datacenter.

13. The non-transitory computer-readable storage medium of claim 11, wherein the at least one security layer function is an L2 function or an L3 function.

14. The non-transitory computer-readable storage medium of claim 11, wherein the method further establishes secure virtual interface communication using nano-services to implement security layer functions in a hypervisor of the datacenter, the method comprising:
- receiving a request to establish a secure nano-session between a virtual network interface controller (vNIC) and the virtual resource;
- generating the nano-service with a shared secret key pair between the vNIC and the nano-service; and
- encrypting the communication between the nano-service and the vR using the shared key established with the nano-service.

15. The non-transitory computer-readable storage medium of claim 11, wherein the nano-service includes an interface for receiving configuration information from a hypervisor or a network administrator.

16. The method of claim 1, wherein the at least one security layer function includes a filtering function that filters data packets based on an internal state of the nano-service where the filtering function is compiled into an image for the nano-service.

17. The electronic device of claim 6, wherein the at least one security layer function includes a filtering function that filters data packets based on an internal state of the nano-service where the filtering function is compiled into an image for the nano-service.

18. The non-transitory computer-readable storage medium of claim 11, wherein the at least one security layer function includes a filtering function that filters data packets based on an internal state of the nano-service where the filtering function is compiled into an image for the nano-service.

* * * * *